(12) United States Patent
Maeda et al.

(10) Patent No.: US 7,931,281 B2
(45) Date of Patent: Apr. 26, 2011

(54) VARIABLE STIFFNESS STABILIZER DEVICE

(75) Inventors: Shingo Maeda, Kashiwara (JP);
Sadahiro Kawahara, Kashihara (JP);
Masanori Arima, Nara (JP); Kosuke Yamanaka, Kashihara (JP)

(73) Assignee: JTEKT Corporation, Osaka (JP)

( * ) Notice: Subject to any disclaimer, the term of this patent is extended or adjusted under 35 U.S.C. 154(b) by 90 days.

(21) Appl. No.: 12/444,109

(22) PCT Filed: Oct. 3, 2007

(86) PCT No.: PCT/JP2007/069384
§ 371 (c)(1),
(2), (4) Date: Apr. 2, 2009

(87) PCT Pub. No.: WO2008/041727
PCT Pub. Date: Apr. 10, 2008

(65) Prior Publication Data
US 2010/0013175 A1 Jan. 21, 2010

(30) Foreign Application Priority Data
Oct. 3, 2006 (JP) ................................. 2006-272096

(51) Int. Cl.
*B60G 21/055* (2006.01)
*B60G 17/015* (2006.01)
(52) U.S. Cl. ....... 280/5.511; 280/124.106; 280/124.107; 280/124.149; 280/124.152; 267/183; 267/188
(58) Field of Classification Search .......... 280/124.106, 280/124.13, 124.137, 124.107, 5.511, 124.149, 280/124.152; 267/183, 188; 248/608
See application file for complete search history.

(56) References Cited

U.S. PATENT DOCUMENTS

| 4,696,489 A | * | 9/1987 | Fujishiro et al. | ............ 280/5.519 |
| 4,796,911 A | * | 1/1989 | Kuroki et al. | ............... 280/5.511 |
| 6,467,784 B1 | * | 10/2002 | Kim | ........................ 280/124.106 |
| 7,159,880 B2 | * | 1/2007 | Budde et al. | ............ 280/124.128 |
| 7,530,584 B2 | * | 5/2009 | Drinan | .................... 280/124.107 |

(Continued)

FOREIGN PATENT DOCUMENTS
FR 2626819 8/1989
(Continued)

OTHER PUBLICATIONS

Crosnier et al., Anti-Roll device which can be adjusted during running for vehicles, Aug. 11, 1989, EPO, FR2626819 A1, English Abstract.*

(Continued)

*Primary Examiner* — Paul N Dickson
*Assistant Examiner* — James English
(74) *Attorney, Agent, or Firm* — Rabin & Berdo, PC

(57) ABSTRACT

A variable stiffness stabilizer device (1) has a stabilizer bar (2) and actuators (3). The stabilizer bar (2) has a torsion bar (4) extending in the lateral direction (X1) of a vehicle and arms (6) connected through bend portions (5) to the ends (4a, 4b) of the torsion bar (4) and bendingly deformed according to the strokes of wheel supporting members (11). Variable bending stiffness parts (13; 130) of the arms (6) are rotatable about the axes (C1) of the arms (6), so that the bending stiffness of the arms (6) can be changed according to their rotational positions. The actuators (3) rotationally drive the variable bending stiffness parts (13; 130) about the axes (C1) to adjust the rotational positions of the variable bending stiffness parts (13; 130).

12 Claims, 7 Drawing Sheets

U.S. PATENT DOCUMENTS

| | | |
|---|---|---|
| 2005/0179221 A1 | 8/2005 | Yasui et al. |
| 2006/0116802 A1 | 6/2006 | Yamada et al. |
| 2009/0008887 A1* | 1/2009 | Buma ..................... 280/5.511 |

FOREIGN PATENT DOCUMENTS

| | | | |
|---|---|---|---|
| FR | 2836093 A1 | * | 8/2003 |
| FR | 2836094 A1 | * | 8/2003 |
| GB | 2275661 A | * | 9/1994 |
| JP | 60-000967 | | 1/1985 |
| JP | 61-064515 | | 4/1986 |
| JP | 3-64804 U | | 6/1991 |
| JP | 09-188120 | | 7/1997 |
| JP | 2000-247126 | | 9/2000 |
| JP | 2004-106654 | | 4/2004 |
| JP | 2005-88722 | | 4/2005 |
| JP | 2005-225300 | | 8/2005 |
| JP | 2006-151262 | | 6/2006 |

OTHER PUBLICATIONS

Crosnier et al., Anti-Roll device which can be adjusted during running for vehicles, Aug. 11, 1989, EPO, FR2626819 A1, Machine Translation of Description.*

Nobuyoshi Sugitani, Active Stabilizer Device, Apr. 7, 2005, JPO, JP 2005-088722 A, English Abstract.*

Nobuyoshi Sugitani, Active Stabilizer Device, Apr. 7, 2005, JPO, JP 2005-088722 A, Machine Translation of Description.*

Nishibori Minoru, Stabilizer for a vehicle, Jun. 25, 1991, JPO, JP 03-064804 U, Hand Translation of Description.*

* cited by examiner

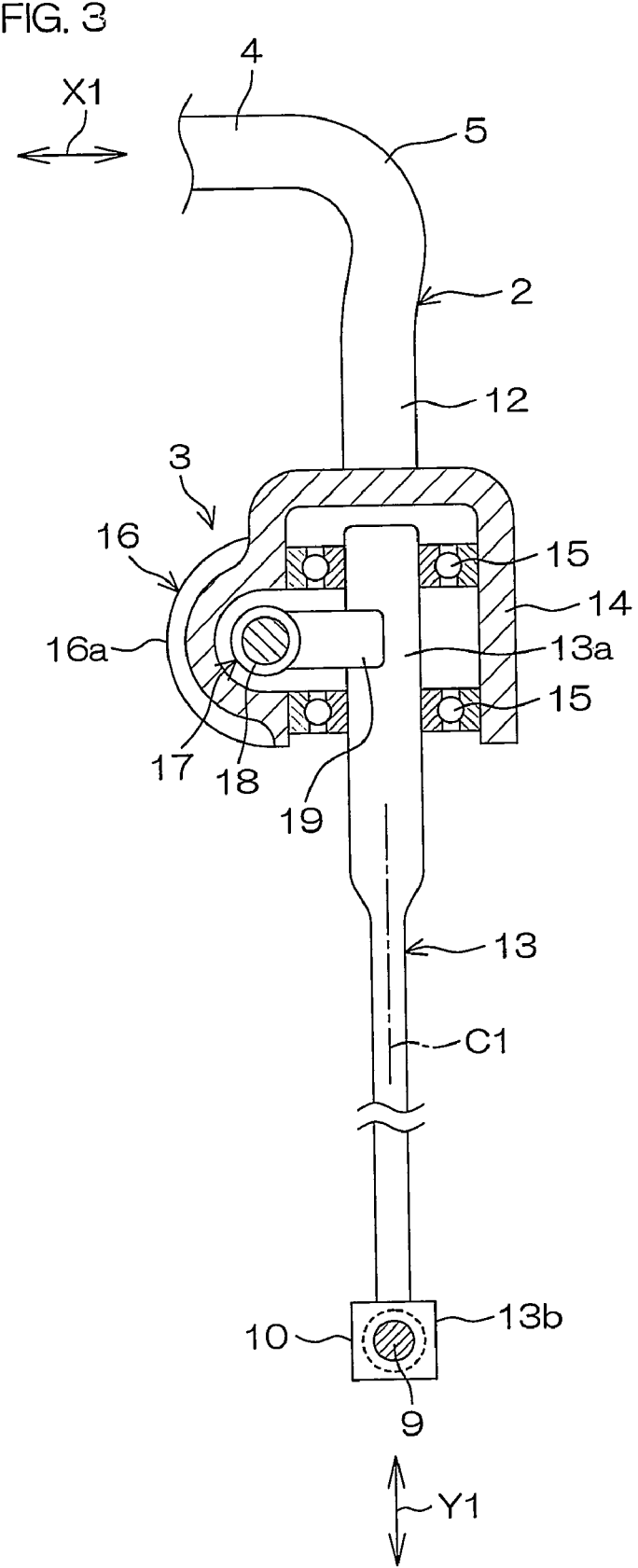

000
VARIABLE STIFFNESS STABILIZER DEVICE

FIELD OF THE INVENTION

The present invention relates to a variable stiffness stabilizer device.

DESCRIPTION OF RELATED ART

There are instances where a vehicle is provided with a stabilizer bar in order to restrain the vehicle from rolling when the vehicle corners. In general, the stabilizer bar has a torsion bar extending in the lateral direction of the vehicle, and a pair of arms respectively connected to the ends of the torsion bar through corresponding bend portions.

There is also proposed a stabilizer device having a function of changing the torsional stiffness of the stabilizer bar (See Patent Document 1, Patent Document 2 and Patent Document 3).

According to Patent Documents 1 and 2, torque is given to a torsion bar by an actuator comprising an electric motor coaxial with the torsion bar, thus changing the torsional stiffness of the stabilizer bar.

According to Patent Document 3, an electric motor is fixed to the inner end of one of a pair of torsion bar portions extending in the lateral direction of a vehicle, a worm is attached to the rotary shaft of the electric motor, and a worm wheel meshed with this worm is attached to the inner end of the other torsion bar portion. Through the worm and the worm wheel, the electric motor gives torque to the torsion bar, thus changing the torsional stiffness of the stabilizer bar.

According to Patent Document 4, torque is given to a torsion bar by a hydraulic actuator comprising a vane motor coaxial with the torsion bar, thus changing the torsional stiffness of a stabilizer bar.

Patent Document 1: Japanese Unexamined Patent Publication No. 2005-225300
Patent Document 2: Japanese Unexamined Patent Publication No. 2006-151262
Patent Document 3: Japanese Unexamined Patent Publication No. 2005-88722
Patent Document 4: Japanese Unexamined Patent Publication No. 1997-188120

SUMMARY OF THE INVENTION

Problems to Be Solved by the Invention

In each of Patent Documents 1 and 2, however, in order to change the torsional stiffness, the actuator comprising the electric motor is required to produce a large torque. Accordingly, the actuator gets inevitably larger, making it difficult to mount the stabilizer device on the vehicle.

According to Patent Document 3, the electric motor is required to produce a large torque when the electric motor actively increases or decreases the stiffness of the stabilizer. Accordingly, the electric motor gets inevitably larger, making it difficult to mount the stabilizer device on the vehicle.

According to Patent Document 4, it is required to dispose a complicated hydraulic circuit, a pressure reducing valve, a check valve and the like, thus making the whole structure complicated and expensive.

It is an object of the present invention to provide an economical variable stiffness stabilizer device having a simple structure.

Means to Solve the Problems

To achieve the above object, a variable stiffness stabilizer device according to an embodiment of the present invention comprises: a stabilizer bar through which the left and right wheel supporting members are joined to each other in order to restrain a vehicle body from rolling; and a pair of actuators, the stabilizer bar comprising: a torsion bar which is supported by the vehicle body and which extends in a lateral direction of the vehicle; and a pair of arms which are respectively connected to a pair of ends of the torsion bar through corresponding bend portions and which are bendingly deformed respectively according to displacements of corresponding wheel supporting members, each of the arms comprising a variable bending stiffness part, which is rotatable around an axis of a corresponding arm and which is capable of changing bending stiffness of the corresponding arm according to a rotational position of the variable bending stiffness part, and each of the actuators being arranged to rotationally drive the variable bending stiffness part of the corresponding arm around the axis thereof, thus enabling the rotational position of the variable bending stiffness part of the corresponding arm to be adjusted.

According to the embodiment above-mentioned, the variable bending stiffness parts disposed at the arms of the stabilizer bar, are respectively rotated around the axes of the arms by the actuators, thus changing the rotational positions of the variable bending stiffness parts. This changes the arms in bending stiffness, resulting in change in the torsional load of the torsion bar connected to the arms through the bend portions. It is therefore possible to adjust desirably the torsional stiffness of the stabilizer bar in its entirety, thus consequently enabling the rolling stiffness of the vehicle body to be desirably adjusted.

Further, since the variable bending stiffness parts hardly receive a torsional load, the actuators are just required to produce such torque as to rotate the variable bending stiffness parts. Accordingly, there may be used, as the actuators, actuators having a simple structure in small sizes.

More specifically, provision is made such that the cross-sectional surfaces of the variable bending stiffness parts are changed in section modulus according to the rotational positions thereof. Accordingly, by adjusting the rotational positions of the variable bending stiffness parts by the actuators, the torsional stiffness of the stabilizer bar in its entirety is changed.

BRIEF DESCRIPTION OF THE DRAWINGS

FIG. 3 is a section view of main portions of the variable stiffness stabilizer device;

DETAILED DESCRIPTION OF PREFERRED EMBODIMENTS

Preferred embodiments of the present invention will be discussed with reference to the attached drawings.

Figure 1:
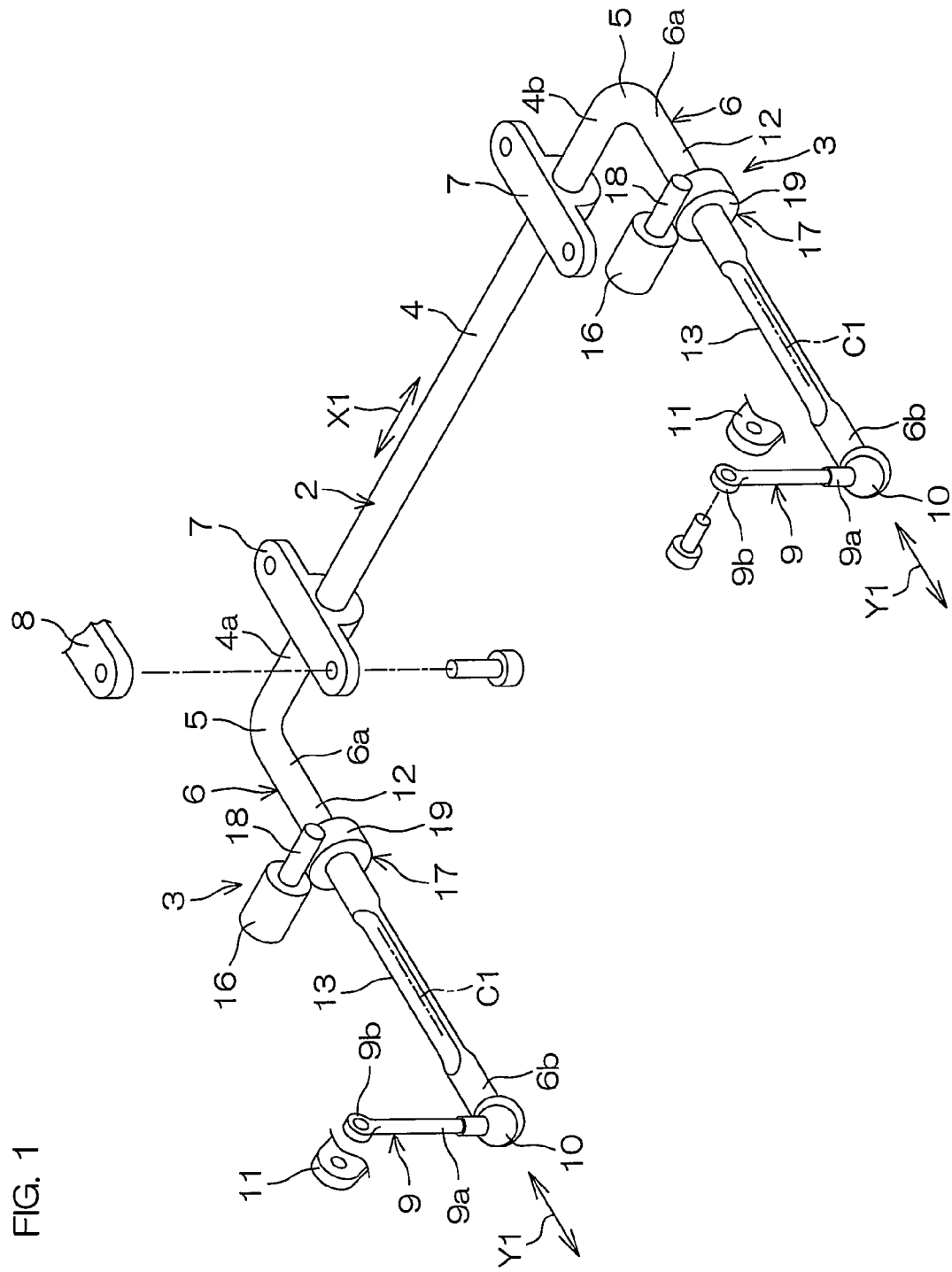
FIG. 1 is a schematic exploded perspective view of a variable stiffness stabilizer device according to an embodiment of the present invention.

FIG. 1 is a schematic perspective view of a stabilizer device according to an embodiment of the present invention. Referring to FIG. 1, the stabilizer device 1 has a stabilizer bar 2 and actuators 3 for changing the torsional stiffness of the stabilizer bar 2.

The stabilizer bar 2 has: a torsion bar 4 disposed such that its longitudinal direction extends along the lateral direction X1 of a vehicle; and a pair of arms 6 respectively connected, at right angles, to the ends 4a, 4b of the torsion bar 4 through corresponding bend portions 5. The pair of arms 6 extend in the longitudinal direction Y1 of the vehicle.

The torsion bar 4 is supported, so as to be rotatable around the axis thereof, by a vehicle body 8 through mounting brackets 7. The torsion bar 4 is supported by the mounting brackets 7 through bushes (not shown).

One end 6a of each arm 6 is connected to the corresponding bend portion 5, while the other end 6b of each arm 6 is connected, through a spherical joint 10, to one end 9a of the corresponding link member 9 vertically movable according to the stroke of the corresponding wheel (not shown). The other ends 9b of the link members 9 are attached to suspension arms 11 serving as wheel supporting members which support the wheels. Thus, the other ends 6a of each arm 6 are vertically movable according to the strokes of the corresponding wheels (or wheel supporting members).

In order to restrain the vehicle body from rolling, the stabilizer bar 2 joins, to each other, the suspension arms 11 serving as the left and right wheel supporting members.

Each arm 6 has: a base portion 12 extending by a predetermined length from one end 6a; and a variable bending stiffness part 13 which is coaxial with the base portion 12 and which is rotatable around the axis C1 of the arm 6.

Figure 2A:
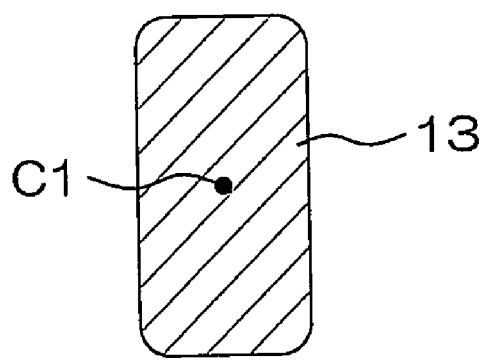
FIG. 2A is a section view of a variable bending stiffness part of an arm of a stabilizer bar, illustrating the state where the variable bending stiffness part is high in stiffness.
Figure 2B:
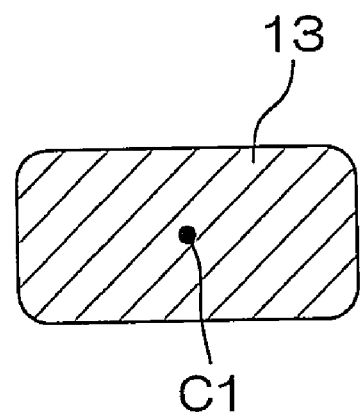
FIG. 2B is a section view of the variable bending stiffness part of the arm of the stabilizer bar, illustrating the state where the variable bending stiffness part is low in stiffness.

As shown in FIG. 2A and FIG. 2B, the main cross-sectional surface of each variable bending stiffness part 13 is formed such that its bending section modulus varies with the rotary position of the variable bending stiffness part 13. More specifically, each variable bending stiffness part 13 has a rectangular cross-sectional surface.

This embodiment is characterized in that the actuators 3 are arranged to rotationally drive the variable bending stiffness parts 13 around the axes C1 to adjust the rotary positions of the variable bending stiffness parts 13, resulting in change in the torsional stiffness of the stabilizer bar 2 in its entirety.

More specifically, as shown in FIG. 3, the base portion 12 is provided at its one end with a tubular support section 14. One end 13a of the variable bending stiffness part 13 is rotatably supported by a pair of bearings 15 held at the inner periphery of the support section 14. The actuator 3 has an electric motor 16 and a worm gear mechanism 17 serving as a transmission mechanism for transmitting torque to the variable bending stiffness part 13 with the number of rotations of the electric motor 16 reduced.

Figure 4:
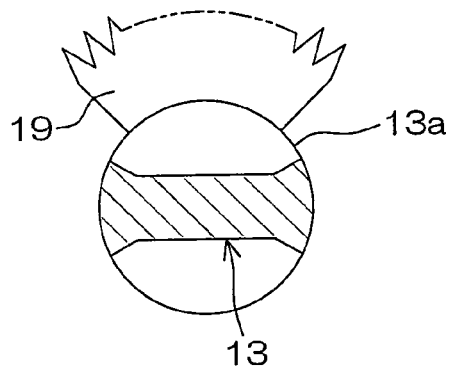
FIG. 4 is a partial section view in side elevation of a variable bending stiffness part.

The worm gear mechanism 17 has a worm 18 serving as a driving gear, and a worm wheel 19 serving as a driven gear which is engaged with the worm 18 and which is rotatable together with the variable bending stiffness part 13. In reality, the worm wheel 19 serving as a driven gear is made in the form of a sector gear provided at a portion of the periphery thereof with teeth portions, as shown in FIG. 4.

Again referring to FIG. 3, the worm wheel 19 in the form of a sector gear is disposed, at one end 13a of the variable bending stiffness part 13, between the pair of bearings 15. A motor housing 16a of the electric motor 16 is formed integrally with the support section 14. More specifically, the support section 14 and the motor housing 16a may be integrally made of a single material (e.g., as an aluminum molded article), or separate members may be attached to each other into a unitary structure.

According to this embodiment, the variable bending stiffness parts 13 disposed at the arms 6 of the stabilizer bar 2, are rotated around the axes C1 of the arms 6 by the actuators 3 each comprising the electric motor 16 and the worm gear mechanism 17, thus causing the variable bending stiffness parts 13 to be changed in rotational position.

Figure 5A:
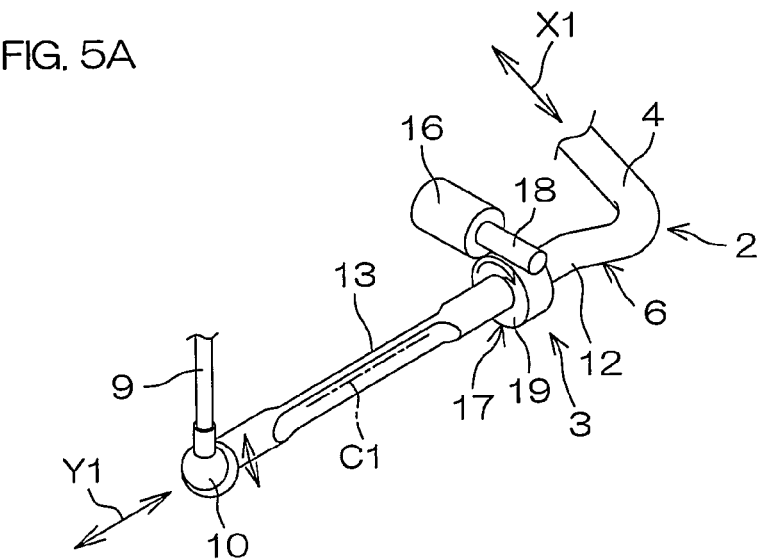
FIG. 5A is a schematic perspective view of main portions of the variable stiffness stabilizer device, illustrating the state where the variable bending stiffness part is high in stiffness.
Figure 6:
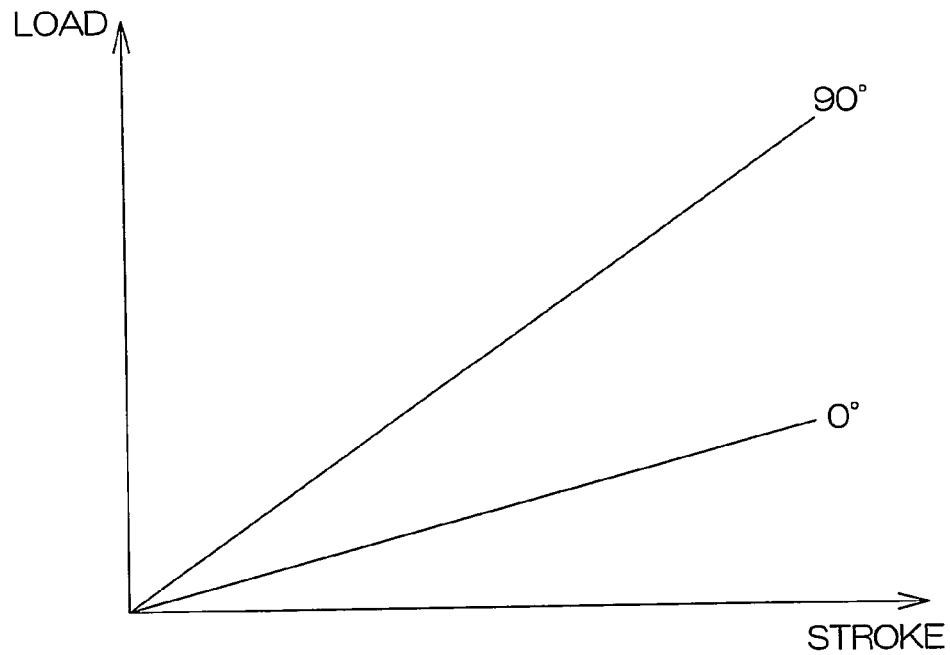
FIG. 6 is a graph illustrating the relationship between the wheel stroke and the load that the stabilizer bar generates.

More specifically, as shown in FIG. 5A and FIG. 2A, when the variable bending stiffness part 13 is displaced to the rotational position (equivalent to 90°) where the variable bending stiffness part 13 is so positioned as to present a vertically long cross-sectional surface, it is possible to obtain, as the loading characteristics of the stabilizer bar 2 in its entirety, a substantially linear loading characteristics as shown as the 90° line in FIG. 6.

Figure 5B:
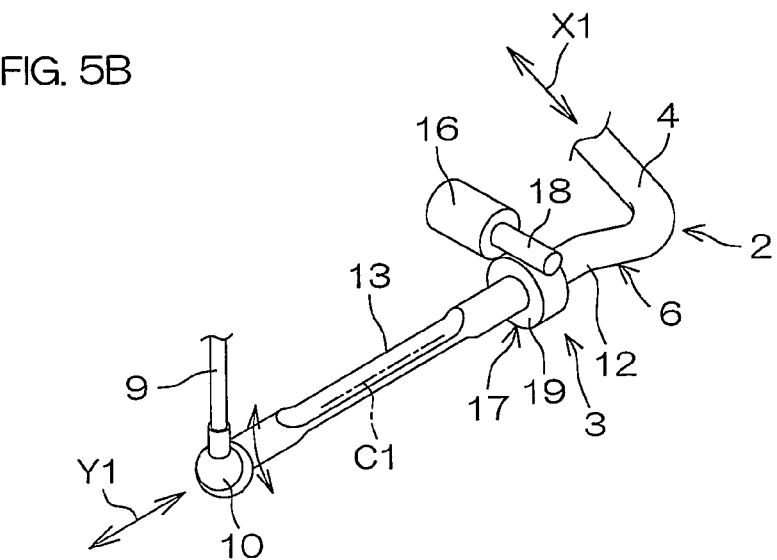
FIG. 5B is a schematic perspective view of main portions of the variable stiffness stabilizer device, illustrating the state where the variable bending stiffness part is low in stiffness.

Further, as shown in FIG. 5B and FIG. 2B, when the variable bending stiffness part 13 is displaced to the rotational position (equivalent to 0°) where the variable bending stiffness part 13 is so positioned as to present a horizontally long cross-sectional surface, it is possible to obtain, as the loading characteristics of the stabilizer bar 2 in its entirety, a substantially linear loading characteristics as shown as the 0° line in FIG. 6.

More specifically, the torsional load of the torsion bar 4 connected to the arms 6 through the bend portions 5, can be changed by changing the bending stiffnesses of the arms 6. This enables the torsional stiffness of the stabilizer bar 2 in its entirety to be desirably adjusted. Accordingly, the rolling stiffness of the vehicle body 8 can be desirably adjusted.

Further, since the variable bending stiffness parts 13 hardly receive a torsional load, it is enough for the actuators 3 to generate such torque as to simply rotate the variable bending stiffness parts 13. Accordingly, there may be used, as each actuator 3, an actuator having a simple structure in small sizes.

More specifically, as each actuator 3 above-mentioned, there can be used the electric motor 16 small both in size and in generating torque. Further, each actuator 3 is arranged such that torque is transmitted to the corresponding variable bending stiffness part 13 with the number of rotations of the electric motor 16 reduced. This can further reduce the torque that the electric motor 16 is required to produce. Thus, there can be used, as the electric motor 16, an economical electric motor small in size. This increases the degree of freedom for disposing the electric motor 16.

Further, the worm gear mechanism 17 is used as a transmission mechanism. Since its inverse input efficiency is low, the worm 18 is not rotated by the inverse input from the wheel side. It is therefore not required to separately dispose a brake mechanism for maintaining each variable bending stiffness part 13 at its adjusted rotational position.

In particular, the following equations (1), (2) and (3) are preferably established:

$$\eta = \tan(\gamma - \rho)/\tan\gamma \quad (1)$$

$$\gamma \leq \rho \quad (2)$$

$$\rho = \tan^{-1}(\mu) \quad (3)$$

wherein η is the transmission efficiency from the worm wheels 19 to the worms 18, γ is the angle of lead of the worms 18, ρ is the friction angle and μ is the friction coefficient.

Thus, since the transmission efficiency η from the worm wheels 19 to the worms 18 is zero or a negative value, it is possible to securely prevent the worms 18 from being rotated by the inverse input from the wheel side. More specifically, the variable bending stiffness parts 13 are autonomously locked at the adjusted rotational positions. Thus, in order to maintain the variable bending stiffness parts 13 at the adjusted rotational positions, the electric motors 16 are not required to generate torque at all times, or any independent brake mechanism is not required to be disposed.

Further, to change the section modulus of the variable bending stiffness parts 13, it is enough to rotate the variable bending stiffness parts 13 around the axes C1 at most 90°. It is therefore possible to use, as the worm wheels 19 serving as reduction gears, sector gears each provided at only a part of the peripheral thereof with teeth. This achieves the miniaturization of the stabilizer device 1.

Further, one ends 13a of the variable bending stiffness parts 13 are rotatably supported, through the bearings 15, by the support sections 14 disposed at the base portions 12 of the arms 6, and the other ends 13b of the variable bending stiffness parts 13 are supported by the link members 9 through the spherical joints 10. Further, at one ends 13a of the variable bending stiffness parts 13, the worm wheels 19 serving as reduction gears are so formed as to be rotatable together with one ends 13a. Accordingly, the variable bending stiffness parts 13 can be rotated extremely smoothly, thus contributing to reduction in load of the electric motors 16.

Further, the support sections 14 and the motor housings 16a of the electric motors 16 are integrally formed. This also contributes to the miniaturization of the stabilizer device 1.

The electric motors 16 are controlled in the following manner. For example, when there are detected a vehicle speed not less than a predetermined value and a vehicle body rolling angle not less than a predetermined value, the variable bending stiffness parts 13 are displaced to the rotational position shown in FIG. 2A and FIG. 5A, thus causing the stabilizer to be brought to the high stiffness position. The rolling angle above-mentioned may be detected based on the comparison of the values detected by stroke sensors of the left and right suspensions, or a lateral acceleration detected by a lateral acceleration sensor may be used for the rolling angle.

As the electric motors 16, step motors may be used. Further, solenoids may be used as the actuators 3. Moreover, provision may be made such that the powers of the electric motors 16 are transmitted to the variable bending stiffness parts 13 through transmission mechanisms comprising wires.

In the embodiment above-mentioned, the rotational angle of each variable bending stiffness part 13 is adjusted in two steps of 0° and 90°. However, such adjustment is not limited to this two-step type. For example, this rotational angle may be adjusted in multisteps comprising 0° and 90° in the range from 0° to 90°. For example, provision may be made such that the rotational angle is changed to 0° or 90° as necessary, while it is normally set to 45°.

Alternatively, the rotational angle may be continuously adjusted to an optional angle in the range from 0° to 90°. Further, the maximum rotational angle may be an angle greater or smaller than 90°.

Figure 7:
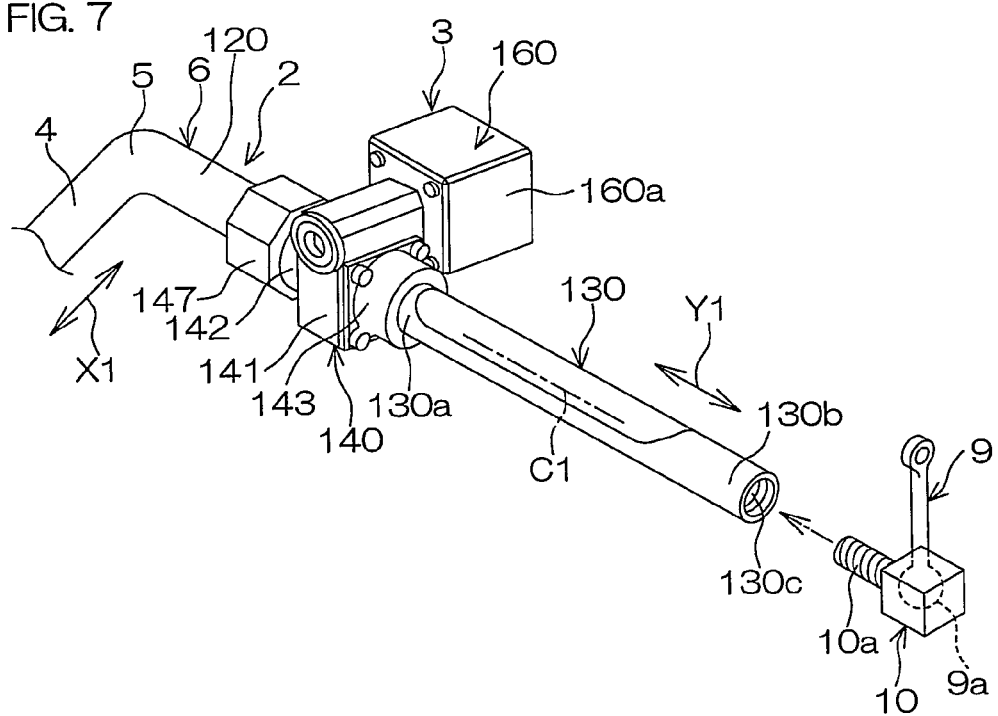
FIG. 7 is a perspective view of main portions of a variable stiffness stabilizer device according to another embodiment of the present invention.
Figure 8:
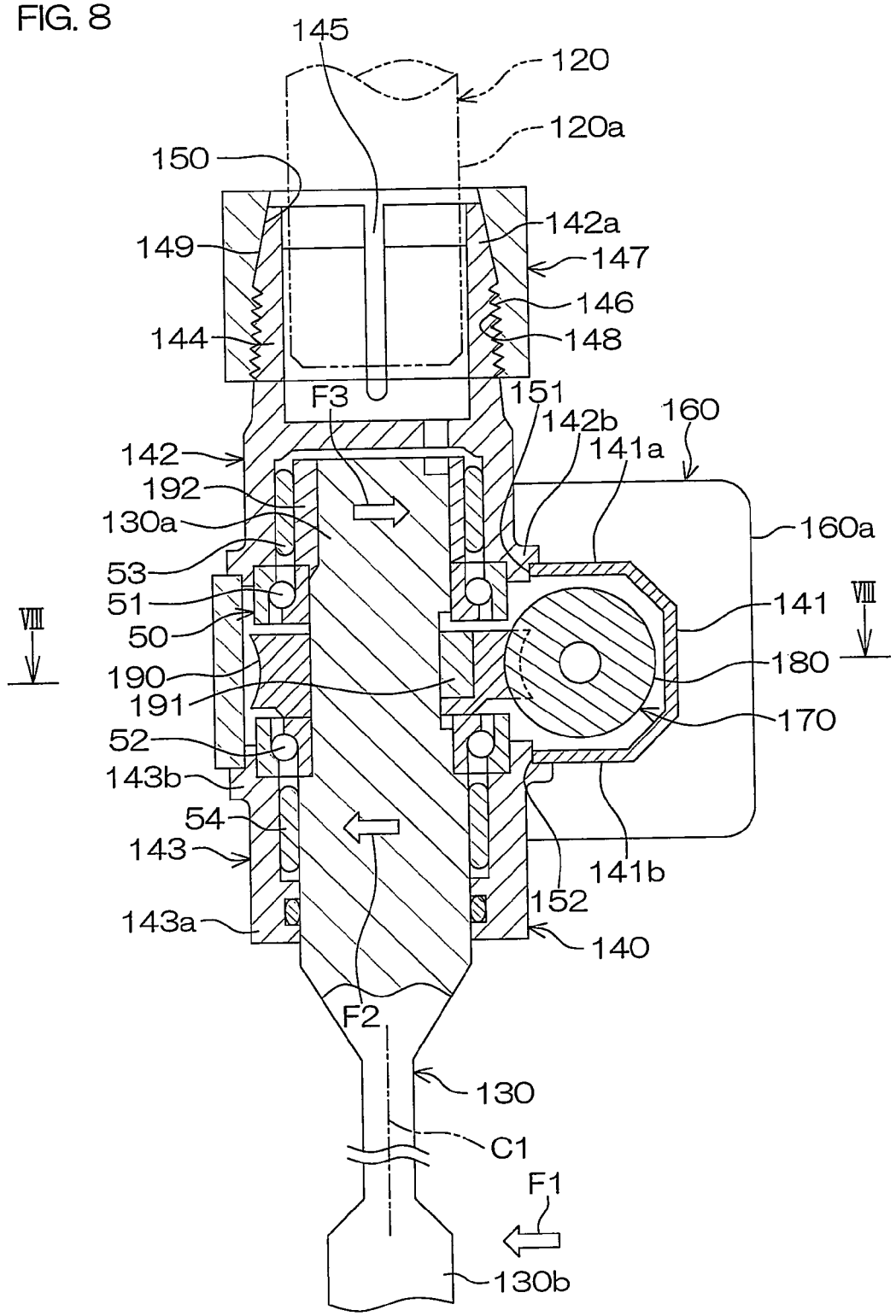
FIG. 8 is a section view of main portions of the variable stiffness stabilizer device in FIG. 7.
Figure 9:
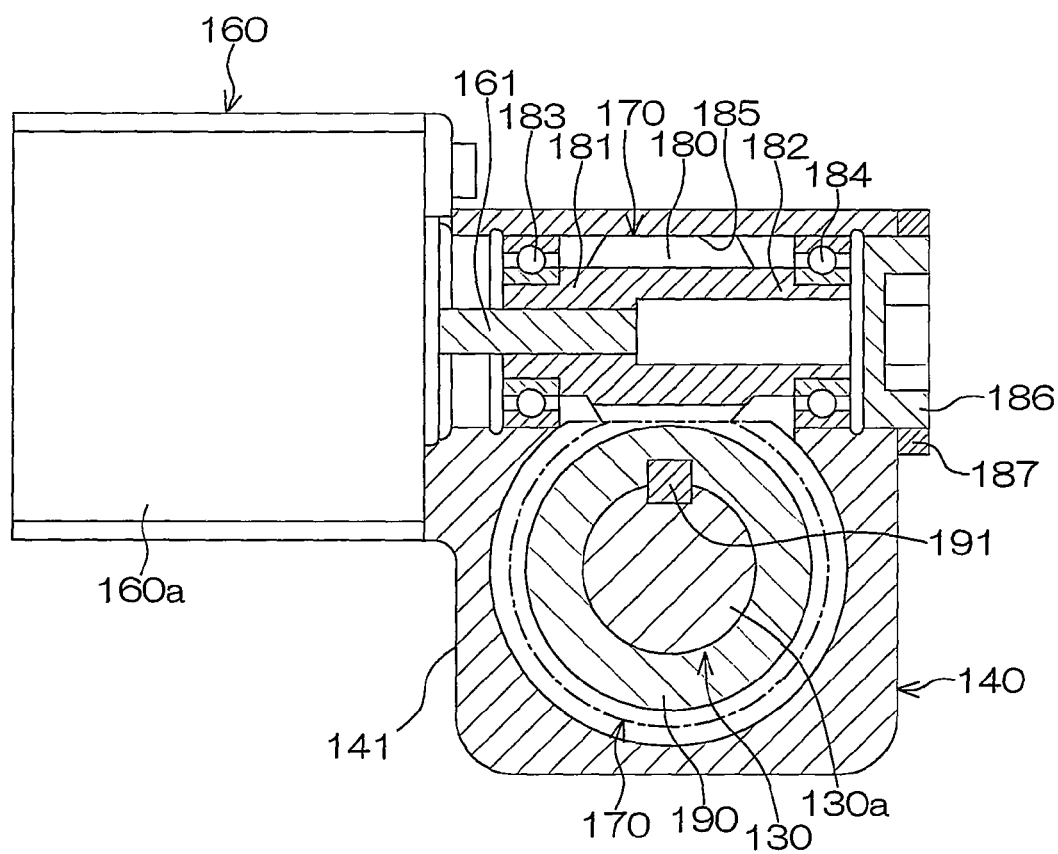
FIG. 9 is a section view taken along the line VIII-VIII in FIG. 8.

FIG. 7 to FIG. 9 show another embodiment of the present invention. In FIG. 7 to FIG. 9, like parts are designated by like reference numerals used in FIG. 1 to FIG. 6, with the description thereof omitted. Referring to FIG. 7, the arm 6 of the stabilizer bar 2 has a base portion 120 and a stiffness changing portion 130 coaxial therewith and rotatable around the axis C1 of the arm 6. The main cross-sectional surface of the stiffness changing portion 130 is the same as that of the variable bending stiffness part 13 shown in FIG. 2A and FIG. 2B.

By an electric motor 160 of the actuator 3, the stiffness changing portion 130 is rotated around the axis C1 abovementioned to adjust the rotational position thereof. This results in change in the torsional stiffness of the stabilizer bar 2 in its entirety.

One end of the base portion 120 is so connected to a support section 140 as to be rotatable around the axis C1 together therewith. Further, one end 130a of the stiffness changing portion 130 is rotatably supported by the support section 140. Formed in the other end 130b of the stiffness changing portion 130 is a connecting hole 130c serving as a connecting portion to be connected to a connecting shaft 10a of the spherical joint 10 connected to one end 9a of the link member 9.

Referring to FIGS. 7 and 8, the support section 140 has: a first housing 141 which houses a worm gear mechanism 170 serving as a transmission mechanism; a second housing 142; and a third housing 143. The second and third housings 142, 143 are attached at both sides of the first housing 141. A motor housing 160a of an electric motor 160 is fixed to the first housing 141.

The second housing 142 has a tubular body having one end 142a and the other end 142b. The second housing 142 is provided in one end 142a thereof with a fitting tube 144 into which one end 120a of the base portion 120 is inserted. The fitting tube 144 has at least one axially extending slit 145. The fitting tube 144 is provided in the outer periphery thereof with a male screw 146 which is fitted to a female screw 148 of a stuffing nut 147.

The fitting tube 144 is provided in the outer periphery of the end thereof with a tapering portion 149 having a tapering shape which is fitted to a tapering portion 150 formed at the inner periphery of the stuffing nut 147. When the stuffing nut 147 is tightened, the fitting tube 144 is reduced in inner diameter under the action of the tapering portions 149, 150. This causes the fitting tube 144 to tighten one end 120a of the base portion 120 such that one end 120a of the base portion 120 is connected to the second housing 142.

The other end 142b of the second housing 142 is inserted into and fixed to a fixed hole 151 in a first lateral wall 141a of the first housing 141.

The third housing 143 has a tubular body having one end 143a and the other end 143b. The other end 143b of the third housing 143 is inserted into and fixed to a fixed hole 152 in a second lateral wall 141b of the first housing 141.

One end 130a of the stiffness changing portion 130 is inserted into the first, second and third housings 141, 142, 143 of the support section 140.

The first housing 141 houses the worm gear mechanism 170 serving as a transmission mechanism. The worm gear mechanism 170 has a worm 180 serving as a driving gear, and a worm wheel 190 serving as a driven gear which is meshed with the worm 180 and which is rotatable together with the stiffness changing portion 130.

Referring to FIG. 9, a pair of ends 181, 182 of the worm 180 are rotatably supported by the first housing 141 through bearings 183, 184, respectively. There are used, as the bearings 183, 184, roller bearings such as ball bearings and the like. The end 181 of the worm 180 is so connected to a rotary shaft 161 of the electric motor 160 as to be rotatable together with the rotary shaft 161.

In the first housing 141, the end of a housing hole 185 for housing the worm 180 is closed by a plug 186. The plug 186 is locked by a lock nut 187.

Referring to FIGS. 8 and 9, the worm wheel 190 is annular and surrounds the periphery of one end 130a of the stiffness changing portion 130. Through a key 191, the worm wheel 190 and the stiffness changing portion 130 are so connected to each other as to be rotatable together with each other.

Referring to FIG. 8, one end 130a of the stiffness changing portion 130 is rotatably supported by the support section 140 through a bearing mechanism 50. The bearing mechanism 50 has a pair of ball bearings 51, 52 and a pair of needle roller bearings 53, 54. As the ball bearings 51, 52, there are preferably used angular ball bearings as shown in FIG. 8.

The worm wheel 190 is disposed between the pair of ball bearings 51, 52, which are disposed between the pair of needle roller bearings 53, 54.

The ball bearing 51 is fitted to and held by the inner periphery of the other end 142b of the second housing 142. The ball bearing 52 is fitted to and held by the inner periphery of the other end 143b of the third housing 143.

The needle roller bearing 53 is disposed between the inner periphery of the second housing 142 and a sleeve 192 so fitted to one end 130a of the stiffness changing portion 130 as to be rotatable together therewith. The needle roller bearing 54 is disposed between the inner periphery of the third housing 143 and the stiffness changing portion 130.

When a load is entered from the wheel side to the other end 130b of the stiffness changing portion 130, a large radial load is generated at the support section 140. On the other hand, a thrust load applied to the support section 140 is small.

When a load F1 is entered from the wheel side to the other end 130b of the stiffness changing portion 130 as shown in FIG. 8, a load F2 is applied to the needle roller bearing 54 and a load F3 is applied to the needle roller bearing 53. For example, when the load F1 is 2000N, the load F2 applied to the needle roller bearing 54 is not less than 10000N.

On the other hand, each of the needle roller bearings 53, 54 has a load capability which can sufficiently stand such a large radial load. In particular, the needle roller bearings 53, 54 extend longitudinally of the long stiffness changing portion 130. A sufficient space is provided in the longitudinal direction of the stiffness changing portion 130, enabling to assure a sufficient length of the needle rollers. As a result, the load capability can be increased.

Further, the needle roller bearings 53, 54 can reduce the layout space in the radial direction. On the other hand, no thrust load is applied to the needle roller bearings 53, 54. The ball bearings 51, 52 receive both radial load and thrust load, but these loads are small. Accordingly, small ball bearings 51, 52 can be used.

Thus, the use of the pair of ball bearings 51, 52 in combination with the pair of needle roller bearings 53, 54 achieves the small variable stiffness stabilizer device 1 high in stiffness.

It is noted that the present invention should not be limited to the embodiments above-mentioned. For example, a hypoid gear mechanism may be used, instead of the worm gear mechanism, in each of the embodiments. In such a case too, the transmission efficiency from the driven gear of the hypoid gear mechanism to the driving gear side can be made zero or negative. This securely prevents the arms from being rotated by an inverse input from the wheel side.

In the foregoing, the present invention has been discussed in detail with reference to the specific examples. However, those skilled in the art may readily conceive their variations, modifications and equivalents. Accordingly, the scope of the present invention should be assessed as that of the appended claims and any equivalents thereto.

This application corresponds to Japanese Patent Application 2006-272096 filed on 3 Oct. 2006 with Japanese Patent Office, the disclosure of which is incorporated herein by reference.

The invention claimed is:

1. A variable stiffness stabilizer device comprising: a stabilizer bar through which the left and right wheel supporting members are joined to each other in order to restrain a vehicle body from rolling; and a pair of actuators, the stabilizer bar comprising: a torsion bar which is supported by the vehicle body and which extends in a lateral direction of the vehicle; and a pair of arms which are respectively connected to a pair of ends of the torsion bar through corresponding bend portions and which are bendingly deformed respectively according to displacements of corresponding wheel supporting members, each of the arms comprising:
  a variable bending stiffness part which is rotatable around an axis of a corresponding arm and which is capable of changing bending stiffness of the corresponding arm according to a rotational position of the variable bending stiffness part,
  a respective support section for rotatably supporting a first end of the corresponding variable bending stiffness part through a pair of bearings;
  the variable bending stiffness part being spherically supported at a second end by a spherical joint which is linked to a corresponding wheel supporting member; and
  the variable bending stiffness part being meshed at the first end with a rotatable driven gear rotatable with the first end, and configured and arranged to rotate the variable bending stiffness part,
  the rotatable driven gear being disposed between the pair of bearings;

wherein:
each of the actuators comprises an electric motor and a transmission mechanism for transmitting torque to the variable bending stiffness part with a number of rotations of the electric motor reduced, wherein the transmission mechanism comprises a driving gear and the driven gear which is meshed therewith and which is rotatable together with the variable bending stiffness part, wherein:
each of the actuators is configured and arranged to rotationally drive the variable bending stiffness part of the corresponding arm around the axis thereof, thus enabling the rotational position of the variable bending stiffness part of the corresponding arm to be adjusted.

2. The variable stiffness stabilizer device according to claim 1, wherein the transmission efficiency from the driven gear to the driving gear is set to zero or a negative value.

3. The variable stiffness stabilizer device according to claim 1, wherein the driving gear comprises a worm and the driven gear comprises a worm wheel.

4. The variable stiffness stabilizer device according to claim 3, wherein the following equations are established:

$$\eta = \tan(\gamma-\rho)/\tan\rho \quad (1)$$

$$\gamma \leqq \rho \quad (2)$$

$$\rho = \tan^{-1}(\mu) \quad (3)$$

wherein $\eta$ is a transmission efficiency from the worm wheel to the worm, $\gamma$ is an angle of lead of the worm, $\rho$ is a friction angle and $\mu$ is a friction coefficient.

5. The variable stiffness stabilizer device according to claim 1, wherein a sector gear is used as the driven gear.

6. The variable stiffness stabilizer device according to claim 1, wherein the support section and a motor housing of the electric motor are integrally formed and having the driving gear and the driven gear disposed within.

7. A variable stiffness stabilizer device configured to restrain a vehicle body from rolling, comprising:
 a stabilizer bar through which left and right wheel supporting members are joined to each other, and a pair of actuators,
 the stabilizer bar comprising: a torsion bar configured to be supported by the vehicle body and to extend in a lateral direction of the vehicle; and a pair of arms which are respectively connected to a pair of ends of the torsion bar through corresponding bend portions and which are bendingly deformed respectively according to displacements of corresponding wheel supporting members,
 each of the arms comprising a variable bending stiffness part which is rotatable around an axis of a corresponding arm and which is capable of changing bending stiffness of the corresponding arm according to a rotational position of the variable bending stiffness part,
 each of the actuators comprising an electric motor and a transmission mechanism for transmitting torque to the variable bending stiffness part with a number of rotations of the electric motor reduced, and each of the actuators being arranged to rotationally drive the variable bending stiffness part of the corresponding arm around the axis thereof, thus enabling the rotational position of the variable bending stiffness part of the corresponding arm to be adjusted, and
 the transmission mechanism comprises a driving gear, and a driven gear which is meshed therewith and which is rotatable together with the variable bending stiffness part,
 wherein each of the arms comprises a support section for rotatably supporting one end of the corresponding variable bending stiffness part through a bearing mechanism;
 each of the variable bending stiffness parts is provided at the one end thereof with the driven gear rotatable together with the one end;
 each of the variable bending stiffness parts is provided at the other end thereof with a coupling portion to be coupled to a link member connected to the corresponding wheel supporting member;
 the bearing mechanism comprises a pair of ball bearings and a pair of needle roller bearings;
 the pair of ball bearings are disposed between the pair of needle roller bearings; and
 the driven gear is disposed between the pair of ball bearings.

8. The variable stiffness stabilizer device according to claim 7, wherein each of the ball bearings comprises an angular ball bearing.

9. The variable stiffness stabilizer device according to claim 7, wherein the transmission efficiency from the driven gear to the driving gear is set to zero or a negative value.

10. The variable stiffness stabilizer device according to claim 7, wherein the driving gear comprises a worm and the driven gear comprises a worm wheel.

11. The variable stiffness stabilizer device according to claim 10, wherein the following equations are established:

$$\eta = \tan(\gamma-\rho)/\tan\rho \quad (1)$$

$$\gamma \leqq \rho \quad (2)$$

$$\rho = \tan^{-1}(\mu) \quad (3)$$

wherein $\eta$ is a transmission efficiency from the worm wheel to the worm, $\rho$ is an angle of lead of the worm, $\rho$ is a friction angle and $\mu$ is a friction coefficient.

12. The variable stiffness stabilizer device according to claim 7, wherein a sector gear is used as the driven gear.

* * * * *